July 5, 1949.  S. SANTO  2,475,463
FOOD FORMING MACHINE
Filed July 17, 1946  4 Sheets-Sheet 1

INVENTOR
Steven Santo
BY
Wooster Davis
ATTORNEYS

July 5, 1949.  S. SANTO  2,475,463
FOOD FORMING MACHINE
Filed July 17, 1946  4 Sheets-Sheet 2

INVENTOR
Steven Santo
BY
Wooster & Davis
ATTORNEYS

July 5, 1949.  S. SANTO  2,475,463
FOOD FORMING MACHINE
Filed July 17, 1946  4 Sheets-Sheet 3
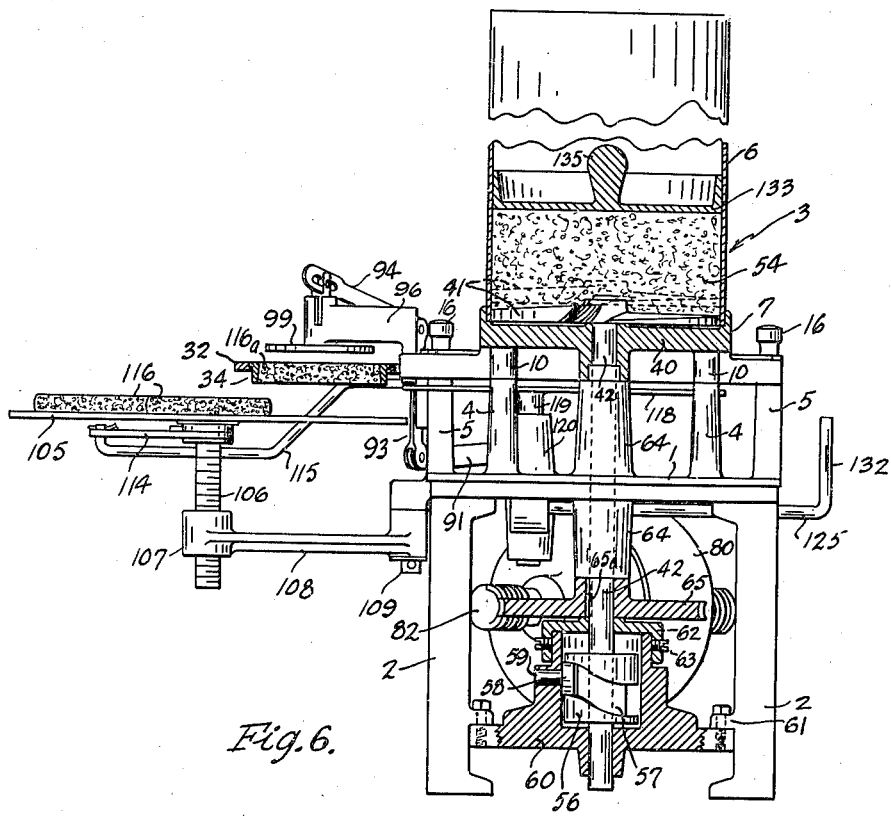
Fig.6.
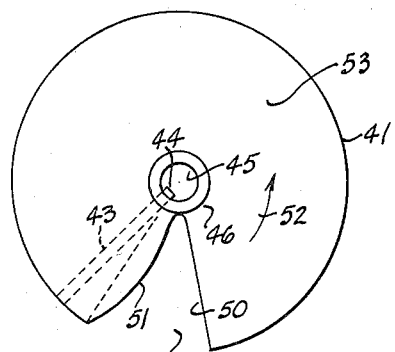
Fig.7.
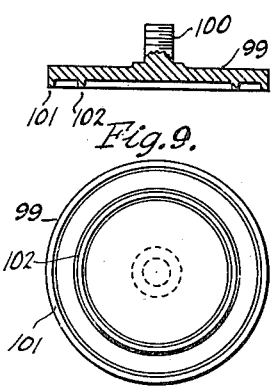
Fig.9.
Fig.10.
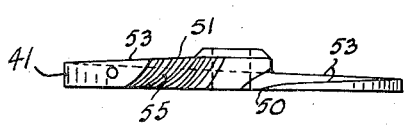
Fig.8.
INVENTOR
Steven Santo
BY
Wooster & Davis
ATTORNEYS July 5, 1949. S. SANTO 2,475,463
FOOD FORMING MACHINE
Filed July 17, 1946 4 Sheets-Sheet 4
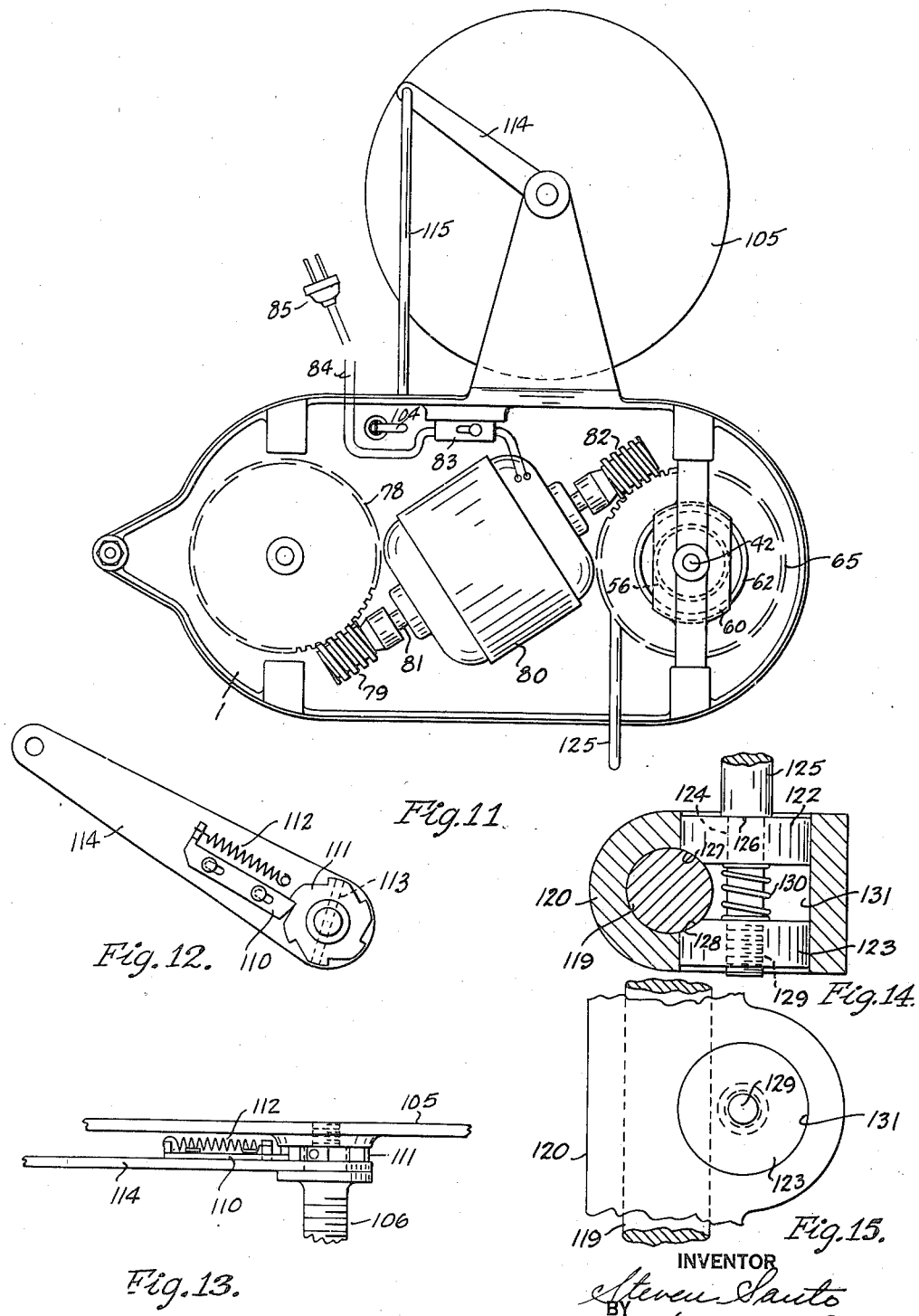
INVENTOR
Steven Santo
BY
Wooster Davis
ATTORNEYS Patented July 5, 1949

2,475,463

UNITED STATES PATENT OFFICE 2,475,463

FOOD FORMING MACHINE

Steven Santo, Deep River, Conn.

Application July 17, 1946, Serial No. 684,355

16 Claims. (Cl. 17—32)

1

This invention relates to a machine for forming chopped or ground foods into patties, and more particularly to a machine for forming patties of Hamburg steak, fish cakes, sausage and the like, although it is not limited to measuring or molding such materials, but could be used with any other material adapted to be measured or molded in a similar manner, as for example measuring powdered plastics for molding.

It has for an object to provide a power driven machine of this type which is entirely automatic, and which has an improved means for feeding the ground meat or other material to the mold uniformly, and which does not press out the juices of the meat or similar material.

Another object is to provide an improved means for measuring and feeding the ground material to the mold.

Another object is to provide a construction in which the reservoir for the chopped or ground material, such as meat, for example, may be quickly and easily detached from or attached to the machine without the use of tools, for cleaning and sterilizing purposes, and still when in the operative position will be firmly clamped so that there is no danger of its becoming loosened or out of place.

Another object is to provide a construction in which the size or thickness of the patties may be varied to produce the desired number from a given amount of material, as for example, so many to the pound.

A further object is to provide a construction in which the patties of meat or other food products may be produced of uniform size and thickness, as well as weight.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 6 is a vertical section through the reservoir and the drive for the feed plate, taken substan-

Figure 1:
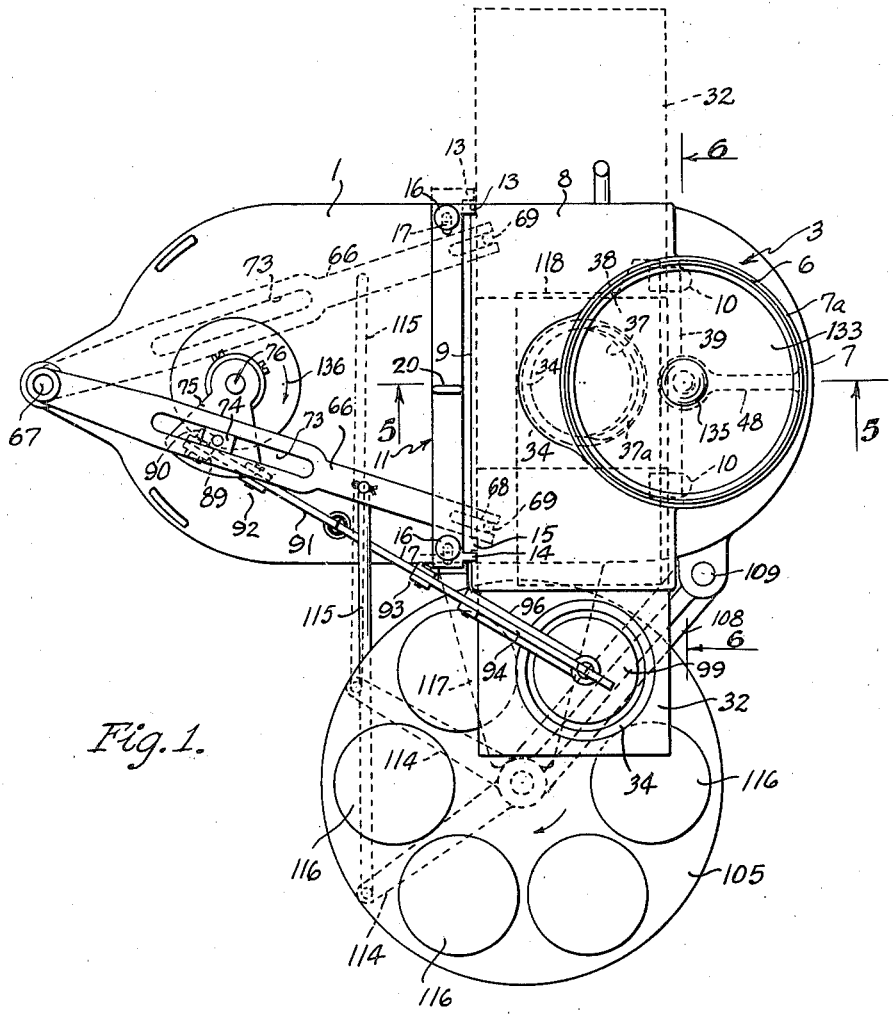
Fig. 1 is a top plan view of the machine.
Figure 4:
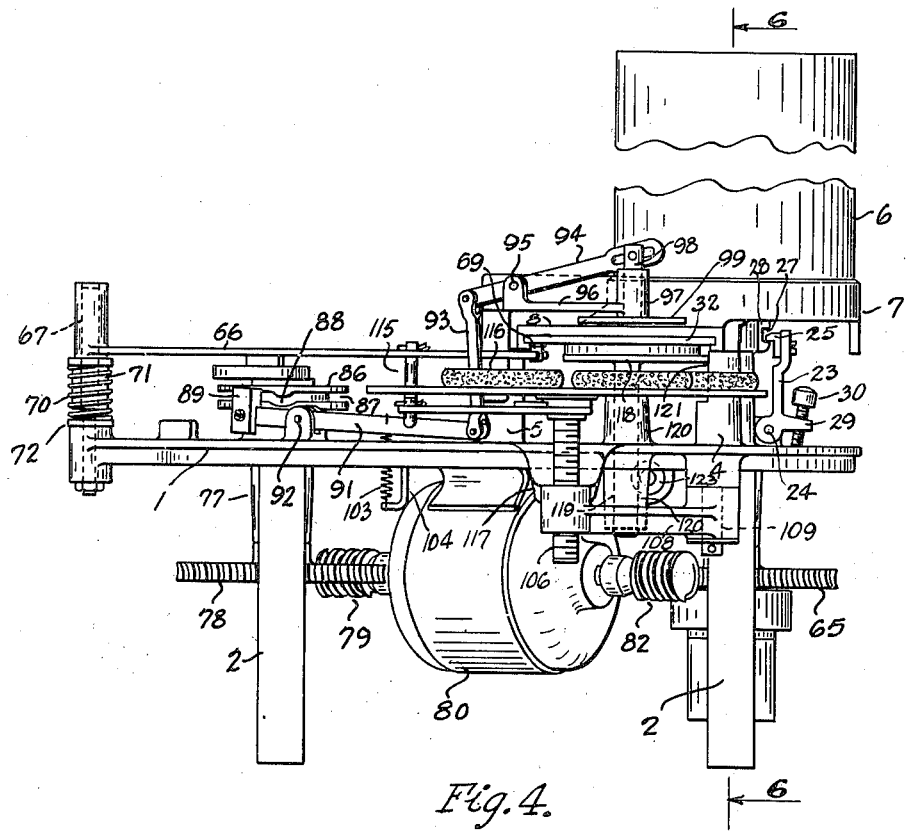
Fig. 4 is an end elevation looking from the bottom of Fig. 1.

2 tially on lines 6—6 of Figs. 1 and 4, and showing the mold in the discharge or unloading position;

Fig. 7 is a top plan view of the feed or pressure plate;

Fig. 8 is an edge view thereof looking from the bottom of Fig. 7;

Fig. 9 is a section of the patty push-out plate;

Fig. 10 is a bottom view thereof;

Fig. 11 is a bottom view of the machine;

Fig. 12 is a plan view of the ratchet drive for the patty receiving plate;

Fig. 13 is a side elevation of this plate and the ratchet drive;

Fig. 14 is a section of the clamping means for the guideplate closing the bottom of the mold, and Fig. 15 is a view thereof looking from the bottom of Fig. 14.

Figure 2:
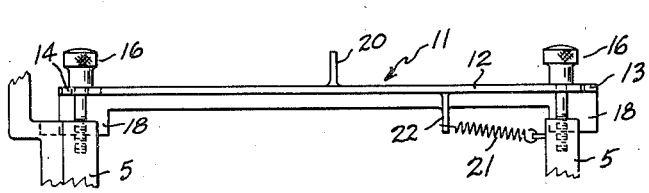
Fig. 2 is a front view of the means for clamping and holding the reservoir and its mounting plate in position.
Figure 3:
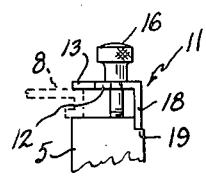
Fig. 3 is an end view thereof.

The machine comprises a suitable frame or bed plate 1 supported on suitable supports such as the legs 2 which may be of any suitable shape, but are preferably of substantially channel shape in cross section to secure the necessary strength with a minimum of weight and material. Mounted on the top side of this plate is the food reservoir 3 supported a suitable distance above the top surface of the plate by suitable supporting lugs or columns 4 and 5 which may be cast integral with the bed plate 1 or could be separate members mounted on this plate. This reservoir comprises a hollow cylinder 6 seated at its lower end in a flange 7a of a flanged portion 7 of a mounting plate 8. This plate with the reservoir is mounted for quick removal from the supporting lugs 4 and 5, so that the device can be thoroughly cleaned and kept sanitary. The forward edge 9 of this plate rests on the top of the columns 5, while under the flanged portion 7 are a pair of lugs 10 seating on the columns 4. The forward edge portion 9 is clamped on the supporting lugs 5 by means of an angle shaped clamping bar 11, the horizontal flange 12 being provided adjacent the opposite ends of the bar with extension lugs 13 and 14 resting on the top of the plate 8. The lug 13 when in clamping position rests on top of the plate 8 adjacent the back edge, as shown in Fig. 1, while the lug 14 rests on the top of this plate at one side of the notch 15 in the edge of this plate. The bar is secured to the supporting columns 5 by means of knurled clamping screws 16 threaded into the tops of the columns and passing through elongated slots 17 in the horizontal flange 12 of the bar, the vertical flange 18 seating in a notch forming a supporting shoulder 19 on each column. On the top is a finger grip 20 and on the under side is a spring 21 connected to a lug 22 on the under side of the bar and one of the columns 5 so as to tend to shift the bar upwardly, as viewed in Fig. 1 or to the right as viewed in Fig. 2, to shift it to the released position, with the lug 13 above or off the edge of the plate 8, as shown in dotted lines Fig. 1, and the lug 14 in alignment with the notch 15.

Cooperating with this clamping means is a releasable clamp 23 under the flanged portion 7, shown in Fig. 4. This is pivoted to the bed plate 1 at 24 and has an adjustable lug 25 adapted to engage the lower inclined wall 26 in the notch 27 in the bearing 28 on the under side of the portion 7. This bearing has a socket 28a (Fig. 5) receiving a reduced upper end 64a of the upright bearing 64 and seating on the shoulder 64b to accurately position the plate 8 and reservoir. The clamp 23 has a lateral lug 29 with a knurled clamping screw 30 by which, by turning the screw, its lower end will react against the plate 1 and swing the lug 25 into the notch 27, and by camming action on the inclined lower wall 26 of this notch will tightly clamp the plate 1 against its supporting lugs 4. On the other side of the plate the free edge 9 is tightly clamped against its supports 5 by means of the screws 16. By merely releasing the screws 16 the spring 21 will shift the bar 11 upwardly, as viewed in Fig. 1, or to the right as viewed in Fig. 2, to a released position, and by unscrewing the screw 30 the clamp 23 may be released so that the plate 8 and the reservoir 6 may be easily and quickly removed from the machine for cleaning and sterilizing, and by reverse operation as easily and firmly clamped in position.

On the underside of the plate 8 are guide grooves 31 (Fig. 5) for the opposite edges of a flat mold plate 32 so that this plate may reciprocate back and forth from the full line or discharge position of Fig. 1 to the dotted line or filling position. This plate is provided with an opening 33 in which is mounted a mold ring 34, this ring being provided with a flange 35 seating in a rabbet or peripheral groove at the upper edge of the opening 33. It will be understood that by using mold rings of different internal diameters 36, different diameters of patties may be formed, and by varying the height of this ring different thicknesses of patties may be formed. To change for different sizes of patties all that is necessary is to remove one ring from the mold plate and substitute in its place a ring having an internal opening of the desired diameter and a ring of proper height and thickness. The opening 36 is tapered downwardly somewhat, as shown in Fig. 5, to facilitate removal of the formed patty from the ring, in a manner presently to be described.

Figure 5:
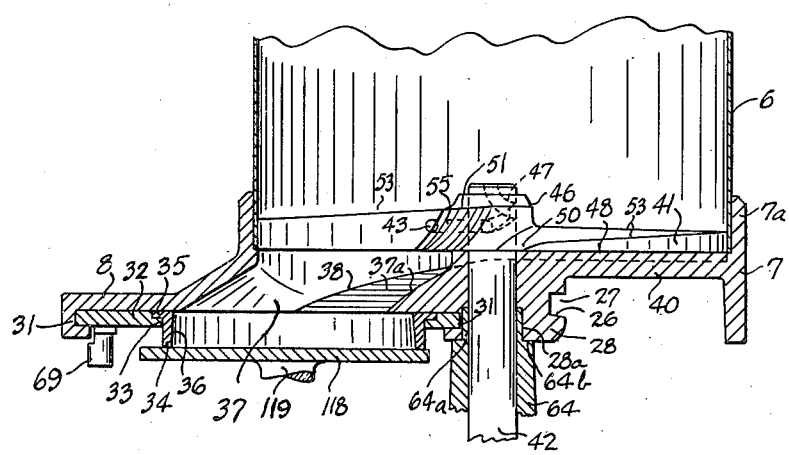
Fig. 5 is a section through the lower portion of the reservoir and the mold plate in position to be filled, the feed or pressure plate being shown in elevation and the section being taken on substantially line 5—5 of Fig. 1.

In the flanged portion 7 under the reservoir 6 is a discharge opening 37 (Fig. 5) located at the inner side of the reservoir over the mold plate 32, and when the mold plate 32 is in the dotted line position of Fig. 1, or in the retracted or filling position, the mold ring 34 is located under this opening, as shown in Fig. 5. The bottom wall 40 of the flanged portion 7 is inclined downwardly toward this opening, as shown at 38, for the whole width of the reservoir and from about the center line of the bottom wall, indicated by the dotted line 39 in Fig. 1. That is, the bottom wall to the left of this dotted line is inclined downwardly toward the opening 37 to guide the material fed from the reservoir to this opening and into the mold ring 34. The inner edge portion of the opening is also inclined and more steeply, as indicated at 37a to guide and facilitate the flow of the material through the opening.

Mounted at the bottom of the reservoir 6 and above the bottom wall 40 is a feed and pressure plate 41 which is mounted for rotation in a horizontal plane and is carried by a drive shaft 42 extending through the bearing 28 in the bottom wall, the plate 41 being mounted on the upper end of this shaft and secured thereto by a suitable detachable means. That shown and preferred comprises a pin 43 (Figs. 5 and 7) mounted in and extending radially of the plate and projecting at its inner end 44 into the opening 45 in the central boss 46 of this plate, and the shaft is provided with a spiral groove 47 leading downwardly from its upper end into which this projecting end 44 extends, this being a right-hand spiral closed at its lower end so that by seating the plate on the shaft with this end 44 in the groove, a partial rotation of the plate 41 will carry it down to the proper position and then this closed end of the groove and the projecting end 44 will form a positive drive connection from the shaft to the plate as well as a stop to limit its downward movement on the shaft and a positioning means to angularly position the plate on the shaft. To remove the plate all that is necessary is to give it a partial revolution in the opposite direction.

The under surface of this plate is flat and in its lowest position rests on the top of a cleaning rib 48 on the upper surface of the bottom wall 40, so that as the plate rotates this rib prevents accumulation of material on the under side of the plate. This plate has a feed notch 49 (Fig. 7) in one side leading from the hub 46 to the peripheral edge of the plate. The forward edge 50 is notched but is substantially straight, as shown in Fig. 7, while the rear edge 51 is preferably curved, as indicated, to form a cutting edge. The plate is relatively thin at the edge 50 and gradually increases in thickness from this edge around to the edge 51 in the direction of the arrow 52 in Fig. 7, which also represents the direction of rotation of the plate in use. Therefore, the top surface 53 of the plate is a gradually inclined surface, and inclines downwardly from the edge 51 around the plate to the edge 50. The edge 51 is the cutting edge, which cuts the material from the bottom of the column 54 of material in the reservoir, so that it may be fed downwardly through the opening 37 into the mold ring 34. The surface of the notch under this curved cutting edge 51 is inclined and curved backwardly and downwardly, as indicated at 55, Fig. 8.

During the cutting and feeding operation the plate 41 is not only rotated, but is given a vertical reciprocating or up and down motion. This is secured by a cylindrical cam 56 (Fig. 6) secured to the shaft 42 and provided with a cam groove 57 in which runs a stationary roller 58 on a stud 59 mounted in a housing 60 supported by a pair of the legs 2 from suitable lugs 61. Mounted on the upper part of this housing is a bearing cap 62 secured to the housing by any suitable means, such as set screws 63. The shaft 42 runs in suitable bearings 64 on the bed plate 1 extending both above and below the plate. Mounted between the lower end of the lower bearing 64 and the bearing cap 62 is a worm gear 65 which is splined to the shaft 42 at 65a so as to drive the shaft but permit the shaft to slide vertically while the gear 65 is held between the bearing 64 and the cap 62. The gear 65 meshes with and is driven by the worm 82 operated by the motor 80.

The pressure or feed plate 41 is rotated and reciprocated up and down in certain timed relation with reciprocation of the mold plate 32 between its loading position, shown in dotted lines Fig. 1, and its discharge or unloading position, shown in full lines in Fig. 1. The reciprocating movement is imparted to the mold plate 32 by an arm 66 (Figs. 1 and 4) pivoted to the bed plate 1 at 67 and slotted at its opposite end, as shown at 68, to receive a drive pin 69 projecting downwardly from the under side of the mold plate 32. The lever rests on and is supported by a coil spring 70 embracing the lower part of the bearing 71 on the lever and resting on a washer 72 on the bed plate 1 around the pivot stud. The lever has a longitudinal slot 73 in which slides the crank block 74 mounted on a crank segment 75 under the lever and mounted to rotate with the upright shaft 76 mounted in suitable bearings 77 formed on the plate. This shaft extends downwardly below the plate, and mounted on it is a worm gear 78 driven by a worm 79 from the motor 80. On the other end of the motor shaft 81 (Fig. 11) is another worm 82 meshing with the worm gear 65 splined to the shaft 42. As these two worms are on opposite ends of the motor shaft and drive the worm wheels in opposite directions, their longitudinal thrusts on the motor shaft counterbalance each other so that no heavy thrust bearing is required. The motor may be controlled by any suitable switch 83 mounted on the other side of the plate 1 and from which leads 84 may be connected to any suitable standard plug-in cap 85 for plugging into any standard outlet receptacle in a house wiring system.

Mounted on the shaft 76 is a cam 86 (Figs. 1 and 4) provided with a cam groove 87 including an offset 88. A follower 89 has a roller 90 running in this cam groove and the follower is mounted on a lever 91 pivoted to the bed plate at 92 and connected by a link 93 to another lever 94 pivoted at 95 to an arm 96 supported on one of the supports 5 and carrying an upright bearing 97 for a vertically reciprocating shaft 98 carrying at its lower end a push-out plate 99, which may be secured to the shaft by means of a threaded stud 100 threaded into the lower end of the shaft so that the plate may be easily detached or changed. On its under surface the plate is provided with spaced concentric ribs 101, 102 to engage the patty in the mold and press it downwardly from the mold when in the discharge position of Fig. 1. These ribs reduce the contact surface of the plate on the patty and reduce to a minimum the liability of the patty sticking to the plate. A spring 103 is hooked at one end over the lever 91 and at its lower end is hooked at one end over the lever 91 and at its lower end is fastened to a downwardly extending support 104 under the bed plate 1 and tends to draw the right hand end of lever 91 downwardly and thus tends to hold the knockout or discharge plate 99 in its upper position.

Located under the mold 34 when in the discharge position shown in full lines Fig. 1 is a rotatable receiving plate 105. This plate is rotated with a step by step movement in certain timed relation with operation of the mold plate 32 and the discharge or push-out plate 99, so that the patties may be deposited in certain positions on the plate, and not drop one on top of the other except as the plate is lowered during its rotative movement. The plate is mounted on a threaded stud 106 threaded into a head 107 of a pivoted arm 108 pivoted to the frame 1 at 109 so that the plate may be swung to the right as viewed in Fig. 1 to carry it out from its loading position to clear it for easy removal of the patties or removal of the plate. It is rotated with a step by step movement by means of a spring pressed pawl 110 (Fig. 12) and the toothed ratchet 111, the pawl being yieldably held against the ratchet by a spring 112, and the toothed wheel being mounted on the spindle 106 and secured to it by any suitable means, such as the pin 113. The pawl is carried on an operating lever 114 to swing about the stud 106, and is connected by a suitable link 115 to the operating lever 66. As this lever 66 moves back and forth it will swing the lever 114 to turn the receiving plate 105 a partial revolution corresponding to the distance between a pair of patties 116 on the plate. As the plate and stud 106 rotate they will move down due to the thread 106, and the pitch of the thread is made such that one revolution will shift the plate 105 down about the thickness of one patty, so that on the next revolution the patties will be deposited on the previously deposited patties and will gradually pile up on the plate. If desired a piece of wax paper may be placed on each of the previously deposited patties to separate the superimposed patties and keep them from sticking together. Inward movement of the plate and the arm 108 may be limited by a stop bracket or arm 117 carried by plate 1 forming an abutment for the end of this arm 108, as shown in Figs. 1 and 4. If desired, means may be provided to automatically stop the machine when the receiving plate is filled.

The under side of the mold ring 34 is always closed by a guide plate 118 (Figs. 1, 4, 5 and 6), except when this ring 34 is in the extended or unloading position over the receiving disc or plate 105, as shown in full lines Fig. 1. This plate 118 is mounted on a suitable supporting stud 119 in a bearing 120 on the frame 1, and is adapted for vertical adjustment so that it may be brought into contact with the lower surface of the ring 34 to effectively close it, and also so that it may be dropped away from the ring to accommodate rings of greater height or thickness. At its inner edge it is guided against an upright guide surface 121 on the two supporting studs 4 so it is held in proper position. It may be clamped in different vertical positions by suitable clamping means, such as the two members 122 and 123 (Fig. 14). Member 122 is a collar on the reduced portion 124 of a rod 125 so that the collar cannot move farther than the stop shoulder 126, and this collar has the curved seat 127 engaging the stud 119. On the opposite side of this stud is the nut 123 having a similar seat 128 to engage the rod, and it is threaded on the reduced portion 124 of the rod, as indicated at 129. A coiled spring 130 embraces the portion 124 between the nut and the collar and tends to shift them in opposite directions or separate them to release the stud 119. The nut and collar are both guided in a transverse opening 131 in one side of the bearing 120 into which one side of the stud 119 projects, so that by turning the rod 125, the collar 122 and the nut 123 are drawn toward each other by action of the shoulder 126 and the threads 129 to clamp the nut and collar on opposite sides of the stud 119, and therefore clamp it and the guide plate 118 carried thereby in the proper position to close the under side of the mold ring 34. This rod 125 extends to one side of the device and is provided with a handle 132 whereby it may be operated to lock and release the stud 119.

Within the cylinder 6 of the reservoir for the ground meat or other material to be shaped into patties is a follower 133 (Fig. 6). This has a rather close fit with the interior wall of the cylinder 6 but has free vertical sliding movement therein. It rests on top of the material 54, and preferably has a flange 134 forming a cup which may support ice for cooling the food, and it may be provided with any suitable handle 135 for lifting it from the reservoir. The reservoir 6 may have cylindrical side walls.

In operation, the reservoir is filled with the food to be formed into patties. As indicated, this may be any suitable material, as meat for Hamburg steaks, fish cakes, sausage, or the like, or it could be used for measuring other food, or even for measuring powdered plastics for molding. This material is pressed down so as to fill in between the side walls of the reservoir 6 and the follower 132 placed on top of it. It will be assumed the feed or pressure plate 41 is in its lower position. Now, as the machine operates, this plate is turned counterclockwise or to the left as one looks down on it, carrying the cutting edge 51 into the chopped meat or other material above it. At the same time the cam groove 57 (Fig. 6) cooperating with the roller 58 moves the shaft 42 upwardly and with it this plate 41. This carries the knife edge 51 upwardly into the material with a sort of spiral movement as the plate rotates. During this operation the mold plate 32 is being retracted or shifted backwardly by the lever 66 to bring the mold ring 34 to its position under the discharge opening 37 in the bottom wall 40 under the reservoir, as shown in Fig. 5. Then the cam 57 brings the feed or pressure plate 41 downwardly so that it forces the food which is now under this plate and has been cut from the lower portion of the mass 54 of this material in the reservoir and presses or forces it through the opening 37 into the ring 34 to completely fill this ring with this material. The flow of the material through this opening into the mold is facilitated by the inclined wall 38 on the top of the bottom wall 40 of the reservoir, and the inclined wall 37a at the side of the opening. The plate 41 therefore presses the material at a uniform consistency into the mold ring and completely fills it with material of a uniform consistency.

As the feed plate 41 moves downwardly, it being a good sliding fit at its outer periphery in the reservoir cylinder 6, it creates a partial vacuum in this reservoir which draws down the mass of material 54 and the follower 133, so that there is an automatic vacuum feed of the material and the follower during each downward movement of the feed plate 41 which maintains the column of food at the lower part of the reservoir automatically, and no positive feed of the follower or other feeding mechanism is required which would complicate the mechanism and might unduly compress the food or press out the juices. As soon as the mold ring 34 is properly filled with the material, the mold plate 32 carrying this ring is shifted downwardly, as viewed in Fig. 1, or toward the observer as viewed in Fig. 4, or to the left as viewed in Fig. 6, to shift the mold plate 32 to the full line position of Fig. 1 and locate the mold ring 34 over the receiving plate 105. This movement is imparted by the operating lever 66. This also brings the mold ring 34 and the patty 116a (Fig. 6) filling the ring under the push-out plate 99, and at this time the roller 90 on the lever 91 runs in the offset 88 of the cam groove 87, forcing this roller downwardly and lifting the other end of the lever 91 to act through the link 93 to give the lever 94 a short quick motion to shift the push-out plate 99 downwardly and force the patty 116a in the mold ring downwardly from this ring and deposit it on the receiving plate 105. Immediately this is done and the push-out plate 99 is raised clear of the mold ring, the mold plate 32 is shifted back by the lever 66 to its dotted line position Fig. 1, to again bring the mold ring 34 to the filling position under the filling opening 37 leading from the reservoir. During this time, the feed plate 41 has been rotated and also raised to carry the cutting knife edge 51 with a spiral movement up into the lower portion of the mass of material in the reservoir, this movement being facilitated by the continuous downwardly inclined top surface 53 of the feed plate 41, which, as indicated above, is inclined downwardly continuously from the edge 51 around the plate to the trailing edge 50.

Due to the operation and arrangement of the crank block 74 and the lever 66 with the crank rotating in the direction of the arrow 136, Fig. 1, it will be seen the motion of the mold plate 32 from the dotted retracted position or loading position to the full line or unloading position, during which it is carrying the formed patty, is a relatively slow movement because the crank 74 is on the side of the shaft 76 opposite to the fulcrum point 67 of the operating lever 66, but on the return movement to carry the unloaded mold plate from the unloading to the loading position this crank is on the side between the shaft 76 and pivot 67 imparting a rapid return movement to the mold plate. Also, when the mold ring 34 is in either the retracted or loading position, or in its extended or unloading position, the operating lever 66 is in its extreme retracted position shown in dotted lines or its extreme advanced position shown in full lines respectively in Fig. 1. It is in these positions that the crank 74 has its least movement in a direction transversely of the plate 1, and therefore the mold plate 32 is given a dwell both when in the loading position and in the unloading position which is sufficient to permit complete loading of the mold ring 34 or the discharge of the formed patty from it, and clearance of the push-out plate 99 from the mold ring. The feed or pressure plate 41 comes down and stays down for about a half revolution, and thus maintains pressure on the patty in the mold ring 34 until the mold slide 32 carrying this ring is slid so as to carry the ring out from under the feed opening 37, so that there is no chance of the patty rising out of the ring. Then this feed plate moves up while the mold plate continues its outward movement, and continues its upward movement while the mold plate is moving backwardly from the unloading position. This feed plate reaches the top of its movement and is slicing into the material as the mold plate moves back toward the loading position. As the mold plate gets back to the loading position the feeding plate 41 comes down, forcing the material under it into the mold ring 34 and holds that position for about 160°, or that is, while the mold plate is being shifted outwardly, carrying the filled mold ring 34 from its position under the filling opening 37. This movement of the loading or feeding plate 41 is imparted by the action of the cam 57, as previously described. The crank 74 permits the lever 66 to substantially pause in its extreme positions due to the position of the crank at substantially right angles to the path of movement of block 74, and there is very little movement of the lever for about a 25° movement of the crank 74, so that the mold plate 32 also pauses or is held substantially stationary when in the loading position to receive the material and also when in the unloading position for the knock-out or unloading operation. These operations of forming and discharging the formed patties continue automatically as long as the machine is operated and there is material to be molded in the reservoir.

Having thus set forth the nature of my invention, I claim:

1. A food forming machine of the character described comprising a reservoir for the food to be formed provided with a discharge opening at the lower part thereof, a mold mounted for movement to and from a position under said opening, a feed plate mounted at the lower part of the reservoir above said opening, and means for rotating the plate and reciprocating it up and down, said plate being provided with a radial notch through it including a knife edge on the rear edge of the notch located higher than the forward edge, said knife edge being adapted to cut into the food material in the reservoir by rotation of the plate, and the plate adapted to force the cut material below it into the mold by downward movement of the plate.

2. A food forming machine comprising a reservoir for the food provided with an outlet opening at the bottom thereof, a mold mounted for movement to and from a position under said opening, a feed plate mounted in the reservoir above said opening, and means for rotating said plate and reciprocating it up and down in certain timed relation with movements of the mold, said plate being provided with means to cut food from the lower part of the supply in the reservoir by its turning movement, and said plate being adapted to force this cut food into the mold by its downward movement.

3. A food forming machine comprising a reservoir for the food provided with an outlet opening at the bottom thereof, a mold mounted for movement to and from a position under said opening, a feed plate mounted in the reservoir above said opening, said plate being provided with a knife edge at one side of an opening through the plate and at the top surface of the plate, means for rotating the plate, and means for at the same time shifting it upward to cut food from the bottom of the supply in the reservoir and pass it through said opening in the plate to the under side thereof and for then shifting the plate downwardly to force the food under the plate into the mold.

4. A food forming machine comprising a reservoir for the food provided with an outlet opening at the bottom thereof, a mold mounted for movement to and from a position under said opening, a feed plate mounted in the reservoir above said opening, said plate being provided with an outwardly tapered opening therethrough for passage of food, the rear edge of said opening being a curved knife edge with the surface immediately under said edge being inclined downwardly and rearwardly, the top surface of the plate being gradually sloped downwardly from said knife edge around the plate to the forward edge of the opening, means for rotating the plate to cut food from the lower part of the supply in the reservoir and pass it through the opening to the under side of the plate, and means for reciprocating the plate to force the material under the plate into the mold.

5. A food forming machine comprising a reservoir for the food provided with an outlet opening at the bottom thereof, a mold mounted for movement to and from a position under said opening, a feed plate mounted in the reservoir above said opening, means for rotating said plate and reciprocating it up and down, said plate being provided with means to cut food from the lower part of the supply in the reservoir by its turning movement and pass it through the plate to the under side thereof so that downward movement of the plate will force this material into the mold, and a follower in the reservoir above the material having a good sliding fit with the walls of the mold so that as the material below the plate is forced into the mold the material above the plate will be forced downwardly by a vacuum suction feed on the material and follower.

6. A food forming machine comprising a reservoir for the food provided with an outlet opening at the bottom thereof, a mold mounted for movement to and from a position under said opening, a follower on the material in the reservoir having a good sliding fit with the walls of this reservoir, a feed plate mounted at the bottom of the reservoir above said opening, said plate being provided with means to cut material from the bottom of the supply in the reservoir and pass it to the under side of the plate, and means for reciprocating the plate so that on its downward movement it will force the material under the plate into the mold and will cause a vacuum suction feed on the material to automatically feed it downwardly into position for the next cutting operation.

7. A food forming machine comprising a plate provided with a feed opening, a guideway formed on the plate, a mold plate mounted for reciprocating movements in said guideway and provided with a mold therein shiftable by said movements between a loading position under said opening and an unloading position spaced therefrom, a reservoir for food mounted on the plate over said opening, and a feed plate mounted in the reservoir over said opening for rotating and reciprocating up and down movements, said feed plate being provided with means operating on combined rotary and upward movement to cut material from that in the reservoir and pass it to the under side of the plate where it is fed into the mold by downward movement of the plate.

8. A food forming machine comprising a reservoir for ground food provided with a discharge opening at the bottom, a mold plate mounted for reciprocating movement under said opening, said mold plate being provided with an opening therethrough including an annular recess around its upper edge, a mold comprising a ring having a flange at its upper side to seat in said recess to support the ring in the opening, a guide plate mounted at the lower side of the ring to close it, means for mounting the guide plate so that it may be shifted toward and from the ring, means for reciprocating the mold plate to shift the mold to and from a position under the discharge opening, and means for forcing food from the reservoir into the mold.

9. A food forming machine comprising a reservoir for the food provided with a discharge opening at the lower part thereof, a mold plate carrying a mold mounted for reciprocating movement to carry the mold between a loading position under the discharge opening and an unloading position at one side thereof, a feed plate in the lower part of the reservoir mounted for rotating and vertical reciprocating movement and including means adapted on rotary movement to cut material from that in the reservoir and pass it to the under side of the plate and on downward movement to force this material into the mold, a push-out member adapted to force the material from the mold when in the unloading position, and means for operating the mold plate, feed plate and push-out plate in certain timed relation with each other.

10. A food forming machine comprising a reservoir for the food provided with a discharge opening at its lower end, an upright shaft projecting into the lower part of the reservoir, a feed plate detachably mounted on the upper end of the shaft, a drive means for rotating the shaft and plate, a cam for vertically reciprocating the shaft, said feed plate being provided with means operating on combined rotary and upward movement to cut material from that in the reservoir and pass it to the under side of the plate, a reciprocal mold plate carrying a mold for movement to and from a position under the discharge opening, means for reciprocating the mold plate, and said feed plate on downward movement adapted to force the material under this plate through said discharge opening into the mold.

11. A food forming machine comprising a bed plate, a food reservoir mounted above the plate provided with a discharge opening at its lower end, an upright shaft mounted in the plate and projected at its upper end into the lower part of the reservoir, a feed plate on the shaft in the reservoir adapted to cut food from that in the reservoir and force it through the discharge opening by rotating and reciprocating movement of the shaft, a mold plate carrying a mold mounted for reciprocating movement under the discharge opening, a lever pivoted to the bed plate and connected to the mold plate for operating it, a second vertical shaft mounted in the bed plate, a crank carried by the latter shaft and connected to the lever for operating it, a motor mounted under the bed plate and including a rotary shaft, and a drive connection from the opposite ends of the motor shaft to the respective upright shafts.

12. A food forming machine comprising a bed plate, a food reservoir mounted above the plate provided with a discharge opening at its lower end, an upright shaft mounted in the plate and projected at its upper end into the lower part of the reservoir, a feed means mounted on the shaft in the reservoir to feed food through the discharge outlet, a mold plate carrying a mold to shift it between a loading position under said opening and an unloading position at one side thereof, means to reciprocate the mold plate comprising a lever pivoted to the bed plate and connected to the mold plate, an upright shaft mounted in the bed plate, a crank on said shaft connected to said lever, a push-out means for forcing the formed food from the mold at the unloading station, a cam on the second shaft, an operative connection from said cam to the push-out means, a motor mounted on the bed plate including a rotary shaft, and gear drive connections from the motor shaft to the respective upright shafts.

13. A food forming machine comprising a food reservoir having a discharge opening at the lower part thereof, a feed plate mounted in the lower part of the reservoir provided with means for forcing food through the discharge opening, an upright shaft projecting into the lower part of the reservoir, means for detachably mounting the feed plate on the shaft comprising a spiral groove extending downwardly from the end of the shaft, a pin mounted in the plate and including an end projecting into said groove, and a mold plate mounted under the discharge opening and carrying a mold to receive material discharged through said opening.

14. A food forming machine comprising a food reservoir provided with a discharge opening, feed means in the reservoir for forcing food through said opening, a mold plate carrying a mold and mounted to shift the mold between a loading position under the opening and an unloading position at one side thereof, a movable receiving plate mounted for rotary and downward movement under the mold at the unloading position, a push-out means at the unloading position to force the formed material from the mold to the receiving plate, means for operating the mold plate and the push-out means in certain timed relation, means operating on each operation of the push-out means to rotate the receiving plate a partial revolution, and means for shifting the receiving plate downwardly a given amount on each turning movement of this plate.

15. A food forming machine comprising a bed plate, upright supports on said plate, a reservoir plate and a food reservoir mounted thereon provided with a discharge opening from its lower end, guides on the reservoir plate, a mold plate mounted for reciprocating in said guides and carrying a mold movable to and from a position under the discharge opening, means for detachably mounting the reservoir plate on said supports comprising a clamping bar having means at its opposite ends to engage over one edge of the plate and shiftable longitudinally to release the plate, clamping screws to clamp the bar and plate, an inclined cam adjacent the opposite edge of the reservoir plate, a clamping lever on the bed plate provided with means to engage said cam to clamp the latter edge of the reservoir plate on a support, and a screw for clamping said lever against the cam.

16. A food forming machine comprising a food reservoir provided with a discharge opening at the lower part thereof, means in the reservoir for forcing food through said opening, a mold plate carrying a mold opening through the top and bottom of the mold plate, means for shifting the mold plate to carry the mold to and from a loading position under the discharge opening, a guide plate under the mold and adapted to be positioned to close its lower side when in the loading position, a stud mounting the guide plate, guide means for the stud permitting up and down movements of the guide plate to and from the mold, and means for securing the guide plate in position including clamps for the stud, and manually operable means for releasing and setting said clamps.

STEVEN SANTO.

REFERENCES CITED

The following references are of record in the file of this patent:

UNITED STATES PATENTS

| Number | Name | Date |
|---|---|---|
| 1,911,017 | Garfunkel | May 23, 1933 |
| 1,981,186 | Nelson | Nov. 20, 1934 |
| 2,021,794 | Leone | Nov. 19, 1935 |
| 2,098,905 | Westin et al. | Nov. 9, 1937 |
| 2,150,659 | Santo | Mar. 14, 1939 |
| 2,185,174 | Hendler | Jan. 2, 1940 |
| 2,187,511 | Baxter | Jan. 16, 1940 |
| 2,366,379 | Bemis | Jan. 2, 1942 |